United States Patent
Hou et al.

(10) Patent No.: US 12,198,236 B2
(45) Date of Patent: Jan. 14, 2025

(54) MAP DATA PROCESSING METHOD AND APPARATUS, AND STORAGE MEDIUM

(71) Applicant: BEIJING BAIDU NETCOM SCIENCE TECHNOLOGY CO., LTD., Beijing (CN)

(72) Inventors: Xiaopei Hou, Beijing (CN); Junjun Zhang, Beijing (CN); Changjun Sheng, Beijing (CN); Juntao Tong, Beijing (CN); Jiajing Fu, Beijing (CN); Dan Ma, Beijing (CN); Yingjie Niu, Beijing (CN); Wenya Liu, Beijing (CN); Yuke Zhang, Beijing (CN); Yun Zhao, Beijing (CN); Youhan Chen, Beijing (CN); Xiufeng Han, Beijing (CN); Xiulong Xia, Beijing (CN); Yang Zhang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 279 days.

(21) Appl. No.: 17/807,132

(22) Filed: Jun. 15, 2022

(65) Prior Publication Data
US 2023/0059277 A1    Feb. 23, 2023

(30) Foreign Application Priority Data
Aug. 20, 2021 (CN) .......................... 202110962870.7

(51) Int. Cl.
*G06T 11/40* (2006.01)
*G06F 16/29* (2019.01)
(Continued)

(52) U.S. Cl.
CPC .............. *G06T 11/40* (2013.01); *G06F 16/29* (2019.01); *G06T 7/13* (2017.01); *G06T 11/206* (2013.01)

(58) Field of Classification Search
CPC ......... G06T 11/40; G06T 7/13; G06T 11/206; G06F 16/29
See application file for complete search history.

(56) References Cited

U.S. PATENT DOCUMENTS

| | | | | | |
|---|---|---|---|---|---|
| 8,799,799 | B1 * | 8/2014 | Cervelli | .................. | G06T 11/60 |
| | | | | | 707/723 |
| 2013/0321397 | A1 | 12/2013 | Chen et al. | | |

FOREIGN PATENT DOCUMENTS

| | | |
|---|---|---|
| CA | 2707246 A1 | 9/2010 |
| CN | 102629432 A | 8/2012 |

(Continued)

OTHER PUBLICATIONS

Chaubey, Aashish, "Downsampling and Upsampling of Images—Demystifying the Theory", Jan. 14, 2020, https://medium.com/analytics-vidhya/downsampling-and-upsampling-of-images-demystifying-the-theory (Year: 2020).*

(Continued)

*Primary Examiner* — Michelle L Sams
(74) *Attorney, Agent, or Firm* — Hunton Andrews Kurth LLP

(57) ABSTRACT

Provided are a map data processing method and apparatus, and a storage medium, which relate to the field of data processing technology and, in particular, to artificial intelligence technology, for example, computer vision, map technology, and intelligent transportation. A specific implementation solution includes: processing landform coverage data according to a type of surface species coverage and a data processing rule associated with the type of surface species coverage to obtain a surface species coverage effect (Continued)

map; and generating a landform map according to the surface species coverage effect map and a reference map.

13 Claims, 8 Drawing Sheets

(51) Int. Cl.
  *G06T 7/13* (2017.01)
  *G06T 11/20* (2006.01)

(56) References Cited

FOREIGN PATENT DOCUMENTS

| CN | 111260749 A | | 6/2020 | |
|---|---|---|---|---|
| CN | 111539481 A | | 8/2020 | |
| CN | 111798448 A | | 10/2020 | |
| CN | 112700547 A | | 4/2021 | |
| CN | 113220810 A | * | 8/2021 | ........... G06F 16/284 |
| WO | WO-2008133790 A1 | * | 11/2008 | ........... G09B 29/007 |
| WO | 2021015877 A1 | | 1/2021 | |

OTHER PUBLICATIONS

First Chinese Search Report issued in Application No. 2021109628707 dated Jun. 18, 2023, 8 pages.
Chinese Office Action issued in Application No. 202110962870.7 dated Jun. 19, 2023, 17 pages.
Li, Jing et al., "Scene Simulation of Slope Soil Erosion Process based on Fractal Theory," China Academic Journal Electronic Publishing House, 2008, 17(1), p. 292-295, 1 page.

* cited by examiner

MAP DATA PROCESSING METHOD AND APPARATUS, AND STORAGE MEDIUM

CROSS-REFERENCE TO RELATED APPLICATION

This application claims priority to Chinese Patent Application No. 202110962870.7, filed on Aug. 20, 2021, the disclosure of which is incorporated herein by reference in its entirety.

TECHNICAL FIELD

The present disclosure relates to the field of data processing technology and, in particular, to the fields of artificial intelligence technology, for example, computer vision, map technology, and intelligent transportation.

BACKGROUND

With the rapid development of computer technology and vehicles, electronic maps are more and more widely applied. Maps can provide visual information about conditions related to geographic objects and locations with the help of a human unique perceptual ability to recognize spatial patterns. At present, the electronic map in the related art merely displays a region range through a black outline on a white background, resulting in monotonic display content. Therefore, the electronic map cannot meet the need of a user to comprehensively understand world geographical information and needs to be improved urgently.

SUMMARY

The present disclosure provides a map data processing method and apparatus, and a storage medium.

According to one aspect of the present disclosure, a map data processing method is provided. The method includes steps described below.

Landform coverage data is processed according to a type of surface species coverage and a data processing rule associated with the type of surface species coverage so that a surface species coverage effect map is obtained.

A landform map is generated according to the surface species coverage effect map and a reference map.

According to another aspect of the present disclosure, a map data processing apparatus is provided. The apparatus includes at least one processor and a memory. The memory is communicatively connected to the at least one processor. The memory stores an instruction executable by the at least one processor. The instruction is executed by the at least one processor to cause the at least one processor to perform steps in the following modules: a surface data processing module, which is configured to process landform coverage data according to a type of surface species coverage and a data processing rule associated with the type of surface species coverage to obtain a surface species coverage effect map; and a landform map generation module, which is configured to generate a landform map according to the surface species coverage effect map and a reference map.

According to another aspect of the present disclosure, a non-transitory computer-readable storage medium is provided. The storage medium stores a computer instruction for causing a computer to perform the map data processing method according to any one of embodiments of the present disclosure.

According to the technology in the present disclosure, the problem of monotonic display content of the electronic map in the related art is solved, and a new type of electronic map including information about surface species coverage is provided, thereby increasing the content diversity of the electronic map and promoting a user to more comprehensively understand landform information of each region in a map.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the present solution and not to limit the present disclosure.

DETAILED DESCRIPTION

Example embodiments of the present disclosure, including details of embodiments of the present disclosure, are described hereinafter in conjunction with the drawings to facilitate understanding. The example embodiments are illustrative only. Therefore, it is to be understood by those of ordinary skill in the art that various changes and modifications may be made to the embodiments described herein without departing from the scope and spirit of the present disclosure. Similarly, the description of well-known functions and constructions is omitted hereinafter for clarity and conciseness.

Figure 1:
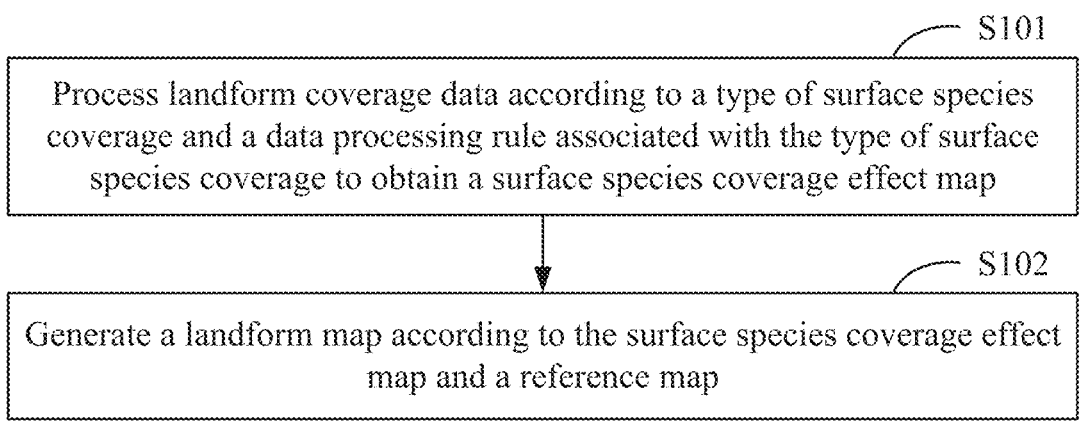
FIG. 1 is a flowchart of a map data processing method according to an embodiment of the present disclosure.

FIG. 1 is a flowchart of a map data processing method according to an embodiment of the present disclosure. Embodiments of the present disclosure are applicable to the case where an electronic map including landform information is generated and, particularly, to the case where an electronic landform map including information about surface species coverage is generated. The method may be performed by a map data processing apparatus which may be implemented by software and/or hardware. As shown in FIG. 1, the map data processing method provided in this embodiment may include steps described below.

In S101, landform coverage data is processed according to a type of surface species coverage and a data processing rule associated with the type of surface species coverage so that a surface species coverage effect map is obtained.

Types of the surface species coverage may refer to types of organisms covering the surface of the earth, which may include, but are not limited to, for example, a forest, grassland, arable land, bare land, and the like. The landform coverage data may be landform coverage data which is classified through remote sensing and collected by a remote sensing satellite. The landform coverage data is typically grayscale image data. A grayscale image includes multiple types of surface organisms, and different surface species coverage regions may be characterized by pixel coordinates and pixel grayscales in the image. The surface species coverage effect map may be an effect map characterizing various types of surface organisms covering the surface of the earth.

For example, in this embodiment, data corresponding to each type of surface species coverage may be extracted from the landform coverage data according to types of surface species coverage into which the surface organisms need to be divided. For example, the data corresponding to each type of surface species coverage may be extracted based on a grayscale of each type of landform coverage data, a tag of each type of landform coverage data, a pixel feature of each type of landform coverage data, or the like. Then, based on the data processing rule associated with each type of surface species coverage, the extracted data of each type of surface species coverage is dynamically rendered separately. Rendering effects corresponding to types of surface species coverage are combined so that a complete surface species coverage effect map is obtained. Optionally, the data processing rule associated with each type of surface species coverage in this embodiment may include, but is not limited to, mapping manners of a region color and a border style, a processing manner for an intersection with another type of data, a refinement manner of a region edge, and the like. For example, in the embodiment of the present application, when a rendering operation is performed, to emphasize and weaken different landforms and improve the up-to-dateness of the generated landform map, different types of surface organisms may be processed and rendered in different manners, that is, data processing rules associated with the types of surface species coverage are different.

It is to be noted that the surface species coverage effect map in the embodiment of the present application is used for generating a landform map. Since data at location points in the map is vector data, data at location points in the surface species coverage effect map is for example the vector data. Therefore, if the landform coverage data used in this embodiment is raster data, the raster data needs to be converted into the vector data before the subsequent operation of generating the surface species coverage effect map is performed.

In S102, the landform map is generated according to the surface species coverage effect map and a reference map.

The reference map may be a basic electronic map in which region boundaries are merely outlined through lines. The landform map may be an electronic map including landform information of regions on the earth. The landform information in this embodiment includes at least the information about the surface species coverage.

Optionally, in the embodiment of the present application, when the landform map is generated according to the surface species coverage effect map and the reference map, the surface species coverage effect map may be disposed in a layer on the reference map to be superimposed and rendered so that the display effect of each region in the surface species coverage effect map is rendered on a corresponding region in the reference map. In this case, the rendered map is the landform map.

Optionally, a region range corresponding to the landform map generated in the embodiment of the present application depends on a region range corresponding to the collected landform coverage data and the reference map. The landform map may be a worldwide landform map, a landform map of a country or a city, a landform map of a scenic spot, or the like.

Optionally, an application scenario of the landform map generated in the embodiment of the present application may be a map application scenario. For example, the landform map may be displayed to a user when the user starts a map application program, or a landform map of a viewed region is displayed to a user when the user starts a particular scenario (such as a road condition viewing scenario, a navigation scenario, or a landform information query scenario) of a map application program. Alternatively, when a change of a map display scale is detected, a corresponding landform map in a current scale may be displayed to a user. The application scenario of the landform map in this embodiment may also be an information retrieval scenario. For example, when a user searches for a country or a city, a landform map of the country or the city may be displayed to the user. It is helpful for the user to better understand landform information throughout the world in various different scenarios.

The solution in the embodiment of the present application may also provide a transition prompt between maps in different scenarios for the landform map. Optionally, the transition prompt may adjust the transparency of the landform map. For example, a transition prompt between a world map and a city map may be adjusting the transparency of the landform map to 70% when the scale of the map is 25 km.

According to the technical solution in the embodiment of the present application, the landform coverage data is processed according to the type of surface species coverage and the data processing rule associated with the type of surface species coverage so that the surface species coverage effect map is obtained, and then, the landform map is generated through rendering based on the surface species coverage effect map and the reference map. The electronic landform map generated according to the solution in the embodiment of the present application includes the information about the surface species coverage, thereby solving the problem of monotonic display content of the electronic map in the related art and increasing the content diversity of the electronic map. In addition, in this embodiment, when the surface species coverage effect map is generated, landform coverage data for different types of surface species coverage is processed based on different rules to emphasize and weaken different landforms and improve the up-to-dateness of the generated landform map. It is convenient for the user to more comprehensively and accurately understand landform information of each region in the map through the landform map.

Figure 2:
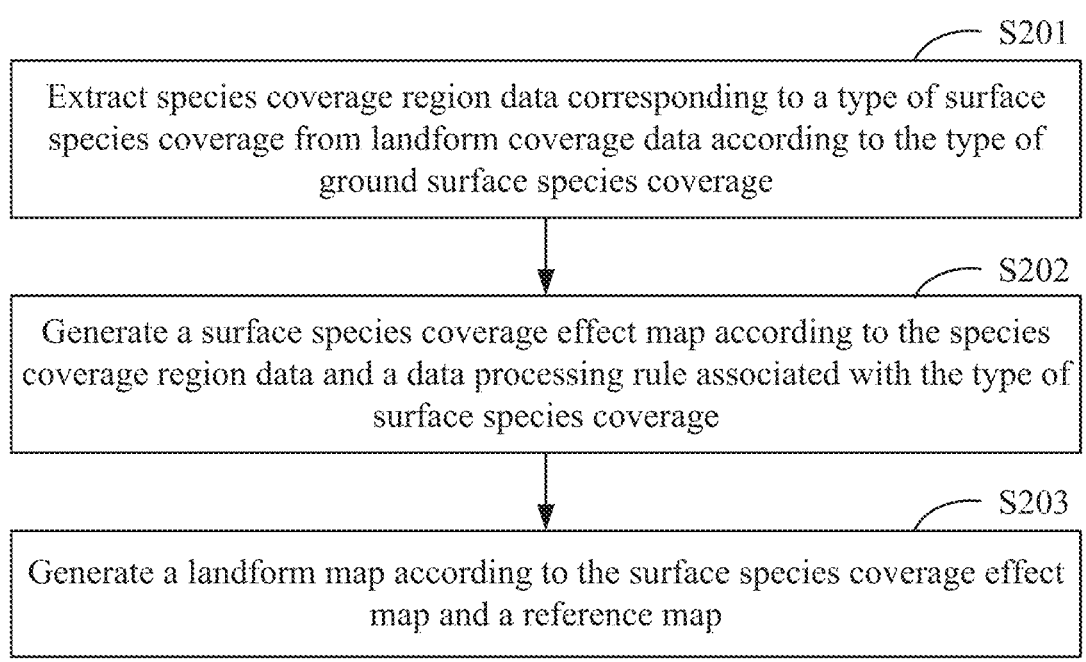
FIG. 2 is a flowchart of a map data processing method according to an embodiment of the present disclosure.

FIG. 2 is a flowchart of a map data processing method according to an embodiment of the present disclosure. Based on the preceding embodiment, in the embodiment of the present disclosure, how to "process the landform coverage data according to the type of surface species coverage and the data processing rule associated with the type of surface species coverage to obtain the surface species coverage effect map" is further explained and described in detail. As shown in FIG. 2, the map data processing method provided in this embodiment may include steps described below.

In S201, species coverage region data corresponding to the type of surface species coverage is extracted from the landform coverage data according to the type of surface species coverage.

The species coverage region data may be information about a distribution region of each surface species on the ground, for example, coordinates of boundary points of the distribution region, coordinates of location points in the distribution region, a coordinate of a center point and a distribution radius of the distribution region, or the like.

Optionally, in the embodiment of the present application, since the collected landform coverage data includes landform coverage data of all types of surface species and the landform coverage data of each type of surface species needs to be processed according to a specific processing rule corresponding to the type of surface species when landform coverage data is processed, in this embodiment, landform coverage data corresponding to each type of surface species coverage is extracted from the landform coverage data according to types of surface species coverage to be divided, and species coverage region data corresponding to each type of surface species coverage is further extracted from the landform coverage data corresponding to the each type of surface species coverage. For example, for the species coverage region data corresponding to each type of surface species coverage, a location region covered by the type of surface species coverage is located and the species coverage region data corresponding to the location region is extracted. For example, edge coordinates of the location region are extracted as the species coverage region data corresponding to the location region; a set of coordinates of location points in the region may be used as the species coverage region data; or a coordinate of a center point and a distribution radius of the region may be used as the species coverage region data, which is not limited in this embodiment.

In S202, the surface species coverage effect map is generated according to the species coverage region data and the data processing rule associated with the type of surface species coverage.

Optionally, in this step, a region (that is, a species coverage region) corresponding to each species in the surface species coverage effect map is determined according to the species coverage region data, species coverage regions corresponding to each type of surface species coverage are sequentially rendered based on a region rendering manner associated with the type of surface species coverage, that is, the species coverage regions corresponding to each type of surface species coverage are rendered into the same layer, and finally, layers corresponding to all types of surface species coverage are combined according to priorities of the types of surface species coverage so that the surface species coverage effect map is obtained. The region rendering manner associated with each type of surface species coverage may include an intra-region filling style (such as a color or a pattern) and a line style of a region edge (such as a color and a thickness). Optionally, each type of surface species coverage may be provided with different region rendering manners according to different scales.

In S203, a landform map is generated according to the surface species coverage effect map and a reference map.

According to the technical solution in the embodiment of the present application, the species coverage region data which corresponds to the type of surface species coverage and is extracted from the landform coverage data is rendered according to the data processing rule associated with each type of surface species coverage so that the surface species coverage effect map is obtained, and then, the landform map is generated according to the surface species coverage effect map and the reference map. According to the solution in the embodiment of the present application, the species coverage region is located and a species coverage effect is rendered, thereby ensuring the accuracy of a rendered region. Each type of species coverage region data is rendered in a respective layer during rendering so as to highlight a corresponding type of surface species coverage, improve the correlation of fragmented data, and further improve the up-to-dateness of the generated landform map.

Figure 3:
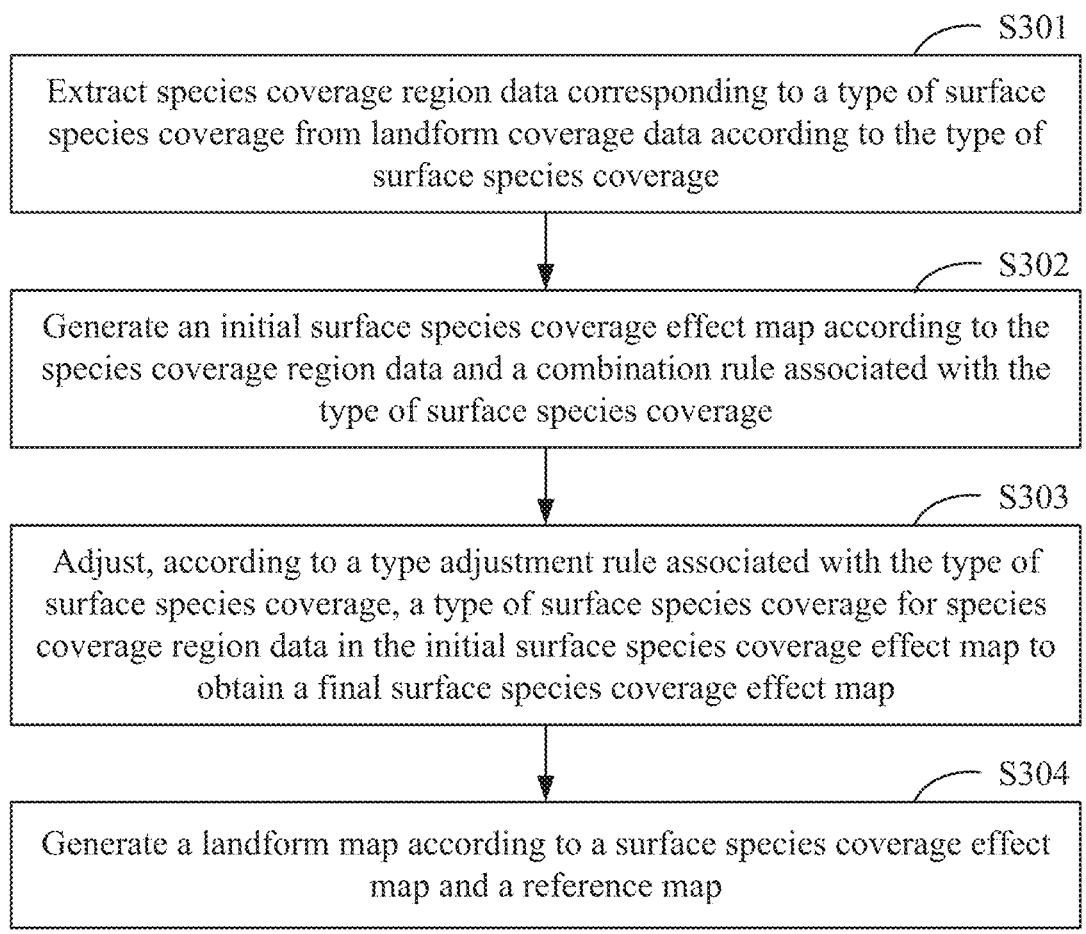
FIG. 3 is a flowchart of a map data processing method according to an embodiment of the present disclosure.

FIG. 3 is a flowchart of a map data processing method according to an embodiment of the present disclosure. Based on the preceding embodiment, in the embodiment of the present disclosure, how to "generate the surface species coverage effect map according to the species coverage region data and the data processing rule associated with the type of surface species coverage" is further explained and described in detail. As shown in FIG. 3, the map data processing method provided in this embodiment may include steps described below.

In S301, the species coverage region data corresponding to the type of surface species coverage is extracted from landform coverage data according to the type of surface species coverage.

In S302, an initial surface species coverage effect map is generated according to the species coverage region data and a combination rule associated with the type of surface species coverage.

The combination rule may be a preset rule on how to process the species coverage region data to generate the surface species coverage effect map. The rule may include, but is not limited to, rules related to the preprocessing (such as cleaning and correction), combination, and rendering of the species coverage region data.

Optionally, in this embodiment, for the species coverage region data for each type of surface species coverage, a coverage effect layer for the type of surface species coverage is sequentially generated according to the combination rule associated with the type of surface species coverage, and all the generated coverage effect layers are combined so that the initial surface species coverage effect map is obtained. For example, this may be implemented through sub-steps described below.

In S3021, a type of surface species coverage for error data in the species coverage region data is corrected according to a region adjoining relationship of the species coverage region data, where the error data is data about a species coverage region whose area is less than an area threshold.

For example, since a surface species typically appears on a tract, and too small a coverage region hardly appears, the type of surface species coverage for a species coverage region with a relatively small area may be determined inaccurately. Therefore, in this sub-step, the type of surface species coverage corresponding to the error data (that is, data about the species coverage region with the relatively small area) in the species coverage region data needs to be corrected. For example, data about a coverage region whose area is less than a preset area threshold may be determined as the error data according to region areas corresponding to the species coverage region data. According to the region adjoining relationship of the species coverage region data, an adjoining species coverage region of the coverage region for the error data is determined and a type of surface species coverage corresponding to the adjoining species coverage region is used as the type of surface species coverage for the error data.

In S3022, combination and rendering are performed, according to a region mapping rule associated with the type of surface species coverage, on species coverage region data belonging to the same type of surface species coverage after an update as one layer so that the initial surface species coverage effect map is generated.

For example, in this sub-step, after the type of surface species coverage for the error data in the species coverage region data is corrected, the species coverage region data of each type of surface species coverage may be used as data in one layer; a corresponding species coverage effect is mapped on a layer corresponding to the type of surface species coverage according to an intra-region filling style (such as a color or a pattern) and a line style of a region edge (such as a color and a thickness) in a preset region mapping rule associated with each type of surface species coverage so that a surface species coverage effect layer of the type of surface species coverage is obtained; and surface species coverage effect layers are combined according to layer levels in the region mapping rule so that the initial surface species coverage effect map is obtained. For example, if a forest coverage effect layer has a higher level than a grassland coverage effect layer, the forest coverage effect layer is disposed on the grassland coverage effect layer during combination.

In the embodiment of the present application, when the initial surface species coverage effect map is generated, a species coverage type for a region with a small area in the species coverage region data is corrected, and the combination and rendering are performed so that the initial surface species coverage effect map is generated, thereby further improving the accuracy and the up-to-dateness of the initial surface species coverage effect map.

In S303, a type of surface species coverage for species coverage region data in the initial surface species coverage effect map is adjusted according to a type adjustment rule associated with the type of surface species coverage so that a final surface species coverage effect map is obtained.

The type adjustment rule may be a preset rule on how to analyze a wrong surface species coverage region and determine its accurate type of surface species coverage. Optionally, in the embodiment of the present application, all types of surface species coverage may be associated with the same type adjustment rule or different type adjustment rules.

Optionally, in the embodiment of the present application, the accuracy of details in the initial surface species coverage effect map may not be high. For example, types of surface species coverage in some special regions (such as a region with a relatively small area or an intersected coverage region of multiple surface species) are lost or determined incorrectly. In this case, the initial surface species coverage effect map can be further refined based on the type adjustment rule, and types of surface species coverage in special regions can be corrected so that a final accurate surface species coverage effect map is obtained. For example, this may be implemented through sub-steps described below.

In S3031, a layer where each type of surface species coverage is located is extracted from the initial surface species coverage effect map.

For example, surface species coverage effect layers of multiple types of surface species coverage are combined and rendered so that the initial surface species coverage effect map is obtained. To improve the accuracy with which a surface species coverage effect is adjusted, in this sub-step, the layer where each type of surface species coverage is located, that is, a surface species coverage effect layer of each type of surface species coverage, may be extracted from the initial surface species coverage effect map. The type of surface species coverage is subsequently adjusted based on each layer.

In S3032, species coverage region data in each layer and a type of surface species coverage for the species coverage region data are adjusted according to a layer level of the type of surface species coverage and an intersection-difference relationship between reference region data of a reference map and the species coverage region data in the each layer.

Each type of surface species coverage has a corresponding layer level which can represent a priority according to which the type of surface species coverage needs to be enhanced in a landform map. For example, it may be set that a forest coverage type is at a first level, a grassland coverage type is at a second level, an arable land coverage type is at a third level, and a bare land coverage type is at a fourth level. The reference region data of the reference map may be a polygon surrounded by a region boundary line, a coastline, and the like in the reference map. The intersection-difference relationship in this embodiment may include, but is not limited to, an intersection relationship, a non-intersection relationship, and a difference relationship.

For example, in this sub-step, intersection region data (species coverage region data within an intersection region) and difference region data (species coverage region data within a difference region) between a layer at the first level and a reference region of the reference map may be retained in the layer at the first level; intersection region data between a layer at another level (a level higher than or equal to the second level) and the reference region of the reference map may be retained in the layer at another level; and additionally, the reference region data may be retained at locations in layers at all levels which have no intersection with the reference region of the reference map (locations not covered by species types corresponding to the layers). Then, for the layer at each level, a type of surface species coverage corresponding to the retained intersection region data is not adjusted; a species coverage type corresponding to the difference region data is adjusted to a type of surface species coverage corresponding to the largest adjoining region of the difference region; and a species coverage type corresponding to the non-intersection region is adjusted to a type of surface species coverage corresponding to the nearest adjoining region. After this sub-step is performed, the final surface species coverage effect map may be obtained.

In the embodiment of the present application, when the final surface species coverage effect map is generated, the species coverage types in regions are adjusted according to the layer level and the intersection-difference relationship between the reference region data of the reference map and the species coverage region data in each layer, thereby improving the accuracy of each species coverage region and ensuring the up-to-dateness of the landform map generated subsequently. For example, coastlines in the landform map are more accurate and the loss of small islands is avoided.

In S304, the landform map is generated according to the surface species coverage effect map and the reference map.

According to the solution in the embodiment of the present application, for the species coverage region data which corresponds to the type of surface species coverage and is extracted from the landform coverage data, the initial surface species coverage effect map is generated according to the combination rule associated with the type of surface species coverage; and the type of surface species coverage for the species coverage region data in the initial surface species coverage effect map is adjusted according to the type adjustment rule associated with the type of surface species coverage so that the final surface species coverage effect map is obtained, so as to generate the landform map. In the embodiment of the present application, a refined correction process of the surface species coverage effect map is added, further improving the accuracy and the up-to-dateness of the generated surface species coverage effect map.

Optionally, in the embodiment of the present application, after the combination and the rendering are performed on the species coverage region data belonging to the same type of surface species coverage after the update as one layer, region overlapping may exist for species coverage region data in different layers. In this case, this embodiment may further include: in response to a region overlapping relationship existing between species coverage region data in at least two layers, adjusting, according to an area size relationship between between regions corresponding to the species coverage region data in the at least two layers, locations where the at least two layers in which the species coverage region data is located are displayed. For example, the species coverage region data in at least two layers corresponding to an overlapping region may be determined, an area of a coverage region corresponding to the species coverage region data in each layer is calculated, and species coverage region data with a small area is rendered onto species coverage region data with a large area. Thus, it is ensured that when multiple surface species coverage regions overlap, each surface species coverage region can also be accurately and comprehensively represented, thereby avoiding the case where a coverage species with a large area shields a coverage species with a small area.

Figure 4:
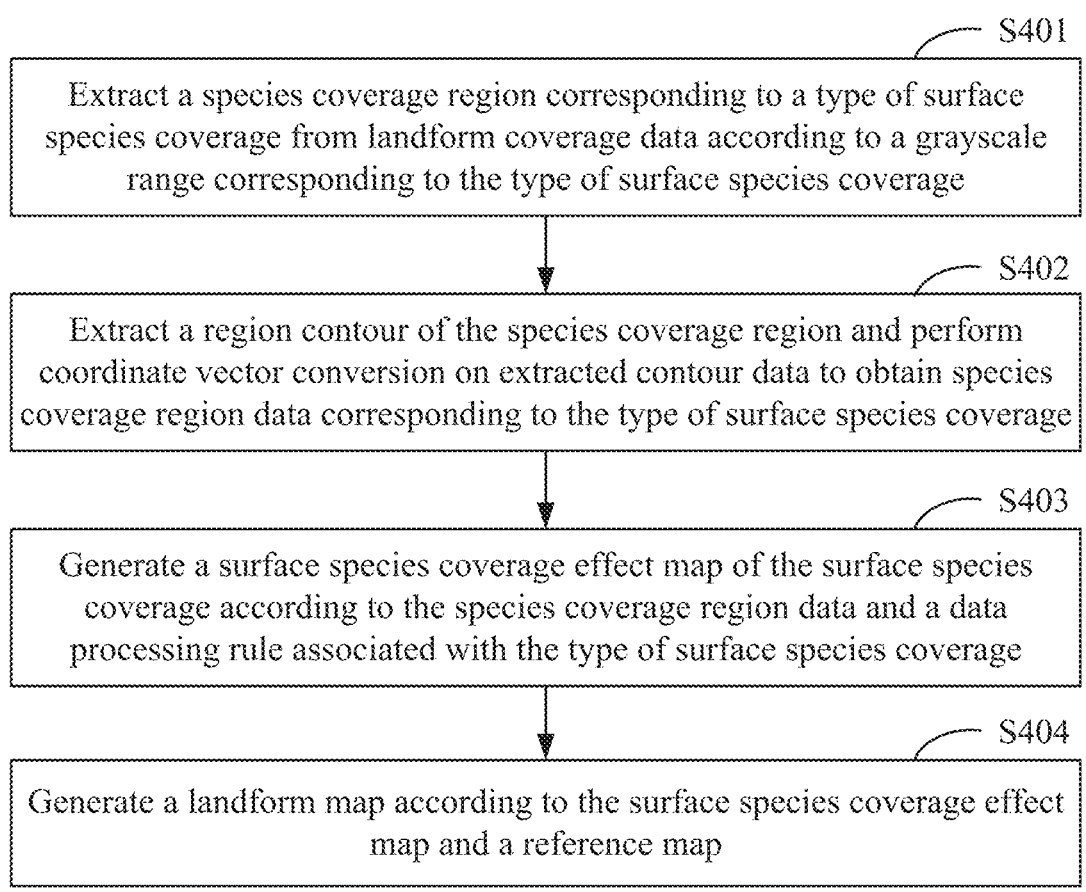
FIG. 4 is a flowchart of a map data processing method according to an embodiment of the present disclosure.

FIG. 4 is a flowchart of a map data processing method according to an embodiment of the present disclosure. Based on the preceding embodiment, in the embodiment of the present disclosure, how to "extract the species coverage region data corresponding to the type of surface species coverage from the landform coverage data according to the type of surface species coverage" is further explained and described in detail. As shown in FIG. 4, the map data processing method provided in this embodiment may include steps described below.

In S401, a species coverage region corresponding to the type of surface species coverage is extracted from the landform coverage data according to a grayscale range corresponding to the type of surface species coverage.

Optionally, the landform coverage data collected by a remote sensing satellite is grayscale image data, where each species can be distinguished by a different grayscale.

Therefore, in this embodiment, grayscales of data at location points in the landform coverage data may be analyzed; and the species coverage region corresponding to each type of surface species coverage is extracted from the landform coverage data based on a preconfigured grayscale range corresponding to the type of surface species coverage in the landform coverage data. For example, for each type of surface species coverage, location coordinates in all landform coverage data belonging to the type of surface species coverage may be regionally aggregated, so as to obtain the species coverage region corresponding to the type of surface species coverage.

In S402, a region contour of the species coverage region is extracted and coordinate vector conversion is performed on extracted contour data so that the species coverage region data corresponding to the type of surface species coverage is obtained.

For example, in this step, the contour of the species coverage region which corresponds to each type of surface species coverage and is extracted in S401 may be extracted using an image edge extraction algorithm, so as to obtain contour coordinate data of each species coverage region. A surface coverage effect map in the embodiment of the present application is used for generating a landform map, it is well known that data at location points in the map is vector data, the landform coverage data collected by the remote sensing satellite is generally raster data, and correspondingly, region contour data obtained based on the processing of the landform coverage data is also the raster data. Therefore, in this embodiment, raster to vector conversion needs to be performed on the contour data based on a raster to vector conversion algorithm. That is, location coordinates in the contour data are converted from the raster data to the vector data, and then the converted contour data is used as the species coverage region data corresponding to each type of surface species coverage.

Optionally, in the embodiment of the present application, to ensure the accuracy of the extracted contour data, the species coverage region corresponding to the type of surface species coverage may be preprocessed before this step is performed. For example, fragmented species coverage regions are connected into a tract through binarization and opening operations, and sporadic species coverage regions are removed using a filtering algorithm such as a median filtering algorithm, so as to improve the smoothness of an edge of the species coverage region.

In S403, a surface species coverage effect map is generated according to the species coverage region data and a data processing rule associated with the type of surface species coverage.

In S404, the landform map is generated according to the surface species coverage effect map and a reference map.

According to the solution in the embodiment of the present application, the species coverage region corresponding to each type is extracted from the landform coverage data according to the grayscale range corresponding to the type of surface species coverage; the contour data of each species coverage region is extracted and subjected to the raster to vector conversion, so as to obtain the species coverage region data; and then the surface species coverage effect map is generated based on the species coverage region data and the data processing rule associated with each type of surface species coverage, and the landform map is generated through rendering according to the surface species coverage effect map and the reference map. According to the solution in the embodiment of the present application, each type of species coverage region can be rapidly and accurately distinguished according to the grayscale. The region contour is extracted as the species coverage region data, thereby greatly reducing the volume of the species coverage region data on the premise of ensuring the accuracy in region characterization and ensuring that the landform map is subsequently generated rapidly and accurately.

Optionally, before the species coverage region corresponding to the type of surface species coverage is extracted from the landform coverage data, the method may further include downsampling the landform coverage data and remapping the type of surface species coverage. For example, the downsampling of the landform coverage data may be collecting a set of landform coverage data at regular intervals of a preset number of rows and/or columns, thereby reducing the volume of the landform coverage data and improving the efficiency with which the landform map is generated. The remapping of the type of surface species coverage may be remapping a species type corresponding to each surface species coverage region according to actual requirements. For example, grassland and arable land may be remapped as the same species coverage type according to the actual requirements. The advantage of the remapping is that types of surface species coverage can be unified flexibly.

Figure 5A:
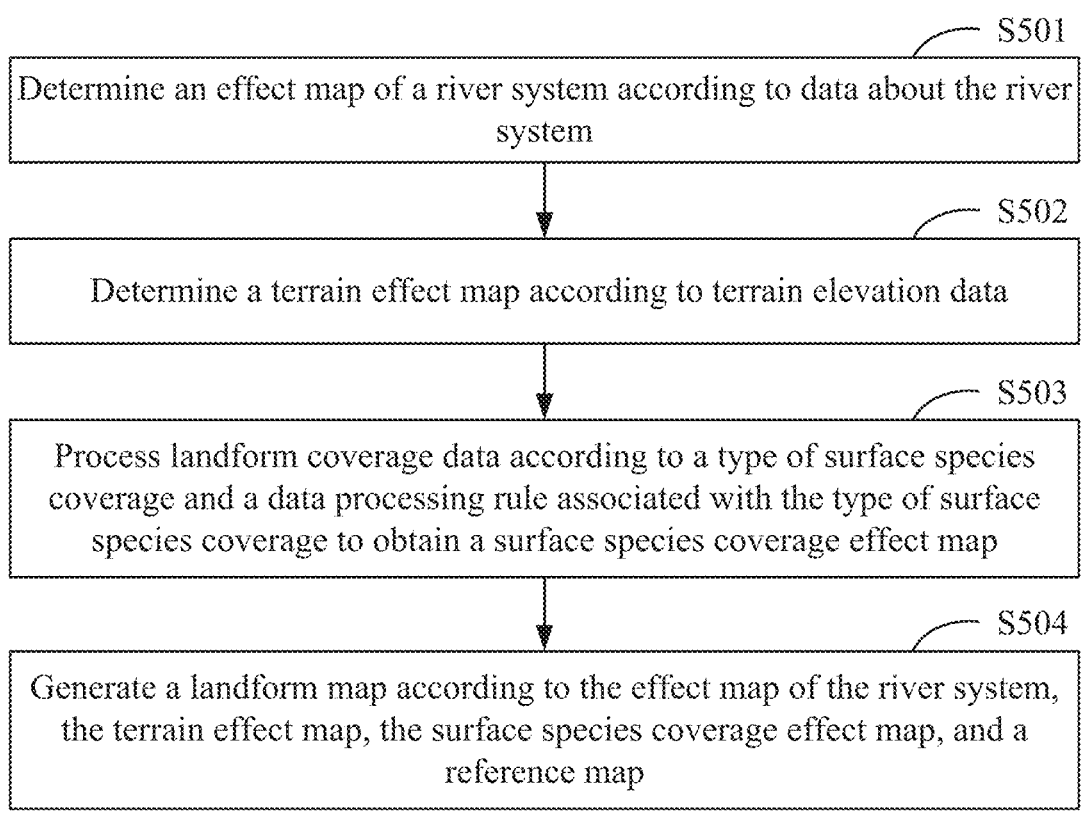
FIG. 5A is a flowchart of a map data processing method according to an embodiment of the present disclosure.
Figure 5B:
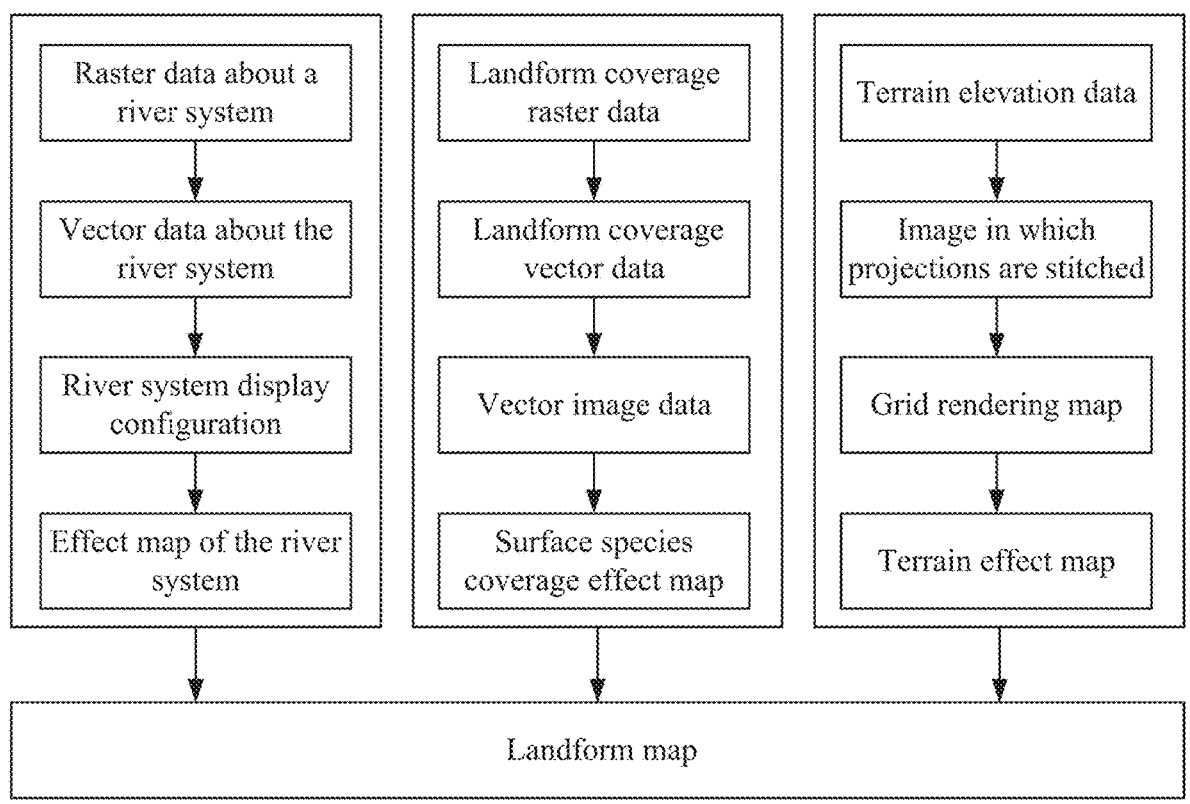
FIG. 5B is a principle diagram of a map data processing method according to an embodiment of the present disclosure.
Figure 5C:
FIG. 5C shows an effect map of a river system according to an embodiment of the present disclosure.
Figure 5D:
FIG. 5D shows a terrain effect map according to an embodiment of the present disclosure.
Figure 5E:
FIG. 5E shows a surface species coverage effect map according to an embodiment of the present disclosure.
Figure 5F:
FIG. 5F shows a landform map according to an embodiment of the present disclosure.

FIG. 5A is a flowchart of a map data processing method according to an embodiment of the present disclosure; FIG. 5B is a principle diagram of a map data processing method according to an embodiment of the present disclosure; FIG. 5C shows an effect map of a river system according to an embodiment of the present disclosure; FIG. 5D shows a terrain effect map according to an embodiment of the present disclosure; FIG. 5E shows a surface species coverage effect map according to an embodiment of the present disclosure; and FIG. 5F shows a landform map according to an embodiment of the present disclosure. Based on the preceding embodiments, in the embodiment of the present disclosure, how to generate an electronic landform map including three types of landform information about a river system, a terrain, and surface species is further explained and described in detail. As shown in FIGS. 5A to 5F, the map data processing method provided in this embodiment may include steps described below.

In S501, an effect map of the river system is determined according to data about the river system.

The data about the river system may be data characterizing information about the river system on the earth. Generally, acquired data about the river system is raster data. The effect map of the river system may be an effect map showing a distribution region and a distribution pattern of the river system on the earth.

For example, as shown in FIG. 5B, since data at location points in the map is vector data, raster to vector conversion is performed on the data about the river system (that is, raster data about the river system) in this step. For example, line raster data and face raster data in the data about the river system may be identified, and then the line raster data and the face raster data identified are converted into the vector data, that is, vector data about the river system is obtained. Then, the vector data about the river system after conversion is rendered according to a preconfigured river system display format so that the effect map of the river system is obtained. For example, FIG. 5C shows an effect map of river systems in regions including the Beaufort Sea and the Gulf of Alaska.

Optionally, the river system display format in this embodiment may be various lines, colors corresponding to planes, frame styles, line thicknesses, and the like which are preconfigured under various scales.

It is to be noted that if the acquired data about the river system itself is the vector data, in this step, the acquired data about the river system may be rendered directly according to a preset river system display format, so as to obtain the effect map of the river system.

In S502, a terrain effect map is determined according to terrain elevation data.

The terrain elevation data is data which is collected through global grids and used for characterizing global terrain surface morphology.

Optionally, in the embodiment of the present application, the terrain elevation data is rendered using a digital elevation model (DEM) so that a world terrain effect map is obtained. As shown in FIG. 5B, a specific implementation process may be as follows: (1) a projection transformation is performed on acquired terrain elevation data, that is, each national coordinate system is transformed into a unified self-defined encrypted coordinate system, ensuring data security; (2) the transformed terrain elevation data is integrally stitched so that a terrain region image (that is, an image in which projections are stitched) is obtained; (3) the obtained terrain region image is segmented into grids such as 100×100 grids, reducing the volume of processed data and facilitating data scheduling during the use of an electronic map; (4) elevation exaggeration corresponding to each grid after segmentation is calculated and then, based on the elevation exaggeration of each grid, a grid rendering map corresponding to each grid is generated using a uniform solar zenith angle and a solar azimuth angle, and all grid rendering maps are stitched so that the terrain effect map is obtained. For example, FIG. 5D shows a terrain effect map of a mountainous region. Shadows in the map can well reflect a stereoscopic effect of a terrain.

In S503, landform coverage data is processed according to a type of surface species coverage and a data processing rule associated with the type of surface species coverage so that a surface species coverage effect map is obtained.

Optionally, as shown in FIG. 5B, in this embodiment, the raster to vector conversion may be performed on landform coverage raster data so that landform coverage vector data is obtained; and the landform coverage vector data is processed according to the data processing rule associated with the type of surface species coverage and the type of surface species coverage, and vector image data is rendered so that the surface species coverage effect map is generated. A specific processing process has been described in detail in the preceding embodiments. The details are not repeated here. For example, FIG. 5E shows a surface species coverage effect map of a region. In the figure, surface regions with different grayscales correspond to different surface species coverage regions; and surface regions with the same grayscale correspond to the same surface species coverage region.

In S504, a landform map is generated according to the effect map of the river system, the terrain effect map, the surface species coverage effect map, and a reference map.

Optionally, as shown in FIG. 5B, in this step, the effect map of the river system, the terrain effect map, and the surface species coverage effect map may be superimposed and rendered onto the reference map so that the landform map integrating a surface effect, a river system effect, and a terrain effect can be obtained. For example, FIG. 5F shows a landform map of a region, where the landform map integrates the surface effect, the river system effect, and the terrain effect.

According to the solution in the embodiment of the present application, the landform map integrating the surface effect, the river system effect, and the terrain effect is generated according to the data about the river system, the terrain elevation data, and the landform coverage data. The landform map displays richer content and can help a user to understand global climate characteristics, the diversity of land coverage types, the distribution of a world river system framework, and terrain distribution effects such as global mountains and depressions, so as to assist the user in better understanding the world.

Figure 6:
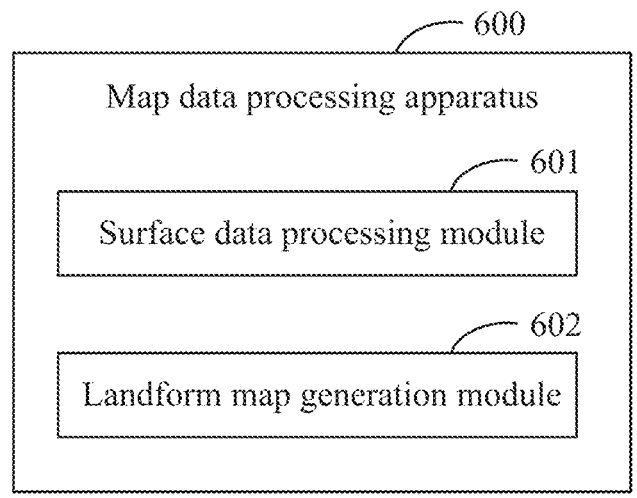
FIG. 6 is a structural diagram of a map data processing apparatus according to an embodiment of the present disclosure.

FIG. 6 is a structural diagram of a map data processing apparatus according to an embodiment of the present disclosure. Embodiments of the present disclosure are applicable to the case where an electronic map including landform information is generated and, particularly, to the case where an electronic landform map including information about surface species coverage is generated. The apparatus may be implemented by software and/or hardware and may implement the map data processing method in any embodiment of the present disclosure.

As shown in FIG. 6, the map data processing apparatus includes a surface data processing module 601 and a landform map generation module 602.

The surface data processing module 601 is configured to process landform coverage data according to a type of surface species coverage and a data processing rule associated with the type of surface species coverage to obtain a surface species coverage effect map.

The landform map generation module 602 is configured to generate a landform map according to the surface species coverage effect map and a reference map.

According to the technical solution in the embodiment of the present application, the landform coverage data is processed according to the type of surface species coverage and the data processing rule associated with the type of surface species coverage so that the surface species coverage effect map is obtained, and then, the landform map is generated through rendering based on the surface species coverage effect map and the reference map. The electronic landform map generated according to the solution in the embodiment of the present application includes the information about the surface species coverage, thereby solving the problem of monotonic display content of the electronic map in the related art and increasing the content diversity of the electronic map. In addition, in this embodiment, when the surface species coverage effect map is generated, landform coverage data for different types of surface species coverage is processed based on different rules to emphasize and weaken different landforms and improve the up-to-dateness of the generated landform map. It is convenient for the user to more comprehensively and accurately understand landform information of each region in the map through the landform map.

Further, the surface data processing module 601 includes a coverage region determination unit and a surface coverage map generation unit.

The coverage region determination unit is configured to extract species coverage region data corresponding to the type of surface species coverage from the landform coverage data according to the type of surface species coverage.

The surface coverage map generation unit is configured to generate the surface species coverage effect map according to the species coverage region data and the data processing rule associated with the type of surface species coverage.

Further, the surface coverage map generation unit includes an image generation subunit and an image refinement subunit.

The image generation subunit is configured to generate an initial surface species coverage effect map according to the species coverage region data and combination rule associated with the type of surface species coverage.

The image refinement subunit is configured to adjust, according to a type adjustment rule associated with the type of surface species coverage, a type of surface species coverage for species coverage region data in the initial surface species coverage effect map to obtain a final surface species coverage effect map.

Further, the image generation subunit unit is configured to perform operations described below.

A type of surface species coverage for error data in the species coverage region data is corrected according to a region adjoining relationship of the species coverage region data, where the error data is data about a species coverage region whose area is less than an area threshold.

Combination and rendering are performed, according to a region mapping rule associated with the type of surface species coverage, on species coverage region data belonging to the same type of surface species coverage after an update as one layer to generate the initial surface species coverage effect map.

Further, the image generation subunit unit is further configured to perform an operation described below.

In response to a region overlapping relationship existing between species coverage region data in at least two layers, locations where the at least two layers in which the species coverage region data is located are displayed are adjusted according to an area size relationship between regions corresponding to the species coverage region data in the at least two layers.

Further, the image refinement subunit is configured to perform operations described below.

From the initial surface species coverage effect map, a layer is extracted where each type of surface species coverage is located.

Species coverage region data in each layer and the type of surface species coverage for the species coverage region data are adjusted according to a layer level of the type of surface species coverage and an intersection-difference relationship between reference region data of the reference map and the species coverage region data in each layer.

Further, the coverage region determination unit includes a coverage region extraction subunit and a region data determination subunit.

The coverage region extraction subunit is configured to extract a species coverage region corresponding to the type of surface species coverage from the landform coverage data according to a grayscale range corresponding to the type of surface species coverage.

The region data determination subunit is configured to extract a region contour of the species coverage region and perform coordinate vector conversion on extracted contour data to obtain the species coverage region data corresponding to the type of surface species coverage.

Further, the coverage region determination unit further includes a data preprocessing subunit.

The data preprocessing subunit is configured to downsample the landform coverage data and remap the type of surface species coverage.

Further, the apparatus also includes a river system data processing module and a terrain data processing module.

The river system data processing module is configured to determine an effect map of a river system according to data about the river system.

The terrain data processing module is configured to determine a terrain effect map according to terrain elevation data.

Correspondingly, the landform map generation module is configured to perform an operation described below.

The landform map is generated according to the effect map of the river system, the terrain effect map, the surface species coverage effect map, and the reference map.

The preceding product may perform the method provided by any embodiment of the present disclosure and has functional modules and beneficial effects corresponding to the performed method.

In the technical solution of the present disclosure, the acquisition, storage, and application of any related data for generating the landform map (such as the landform coverage data, the river system data, elevation map data, and the reference map) involved therein comply with provisions of relevant laws and regulations and do not violate public order and good customs.

According to embodiments of the present disclosure, the present disclosure further provides an electronic device, a readable storage medium, and a computer program product.

Figure 7:
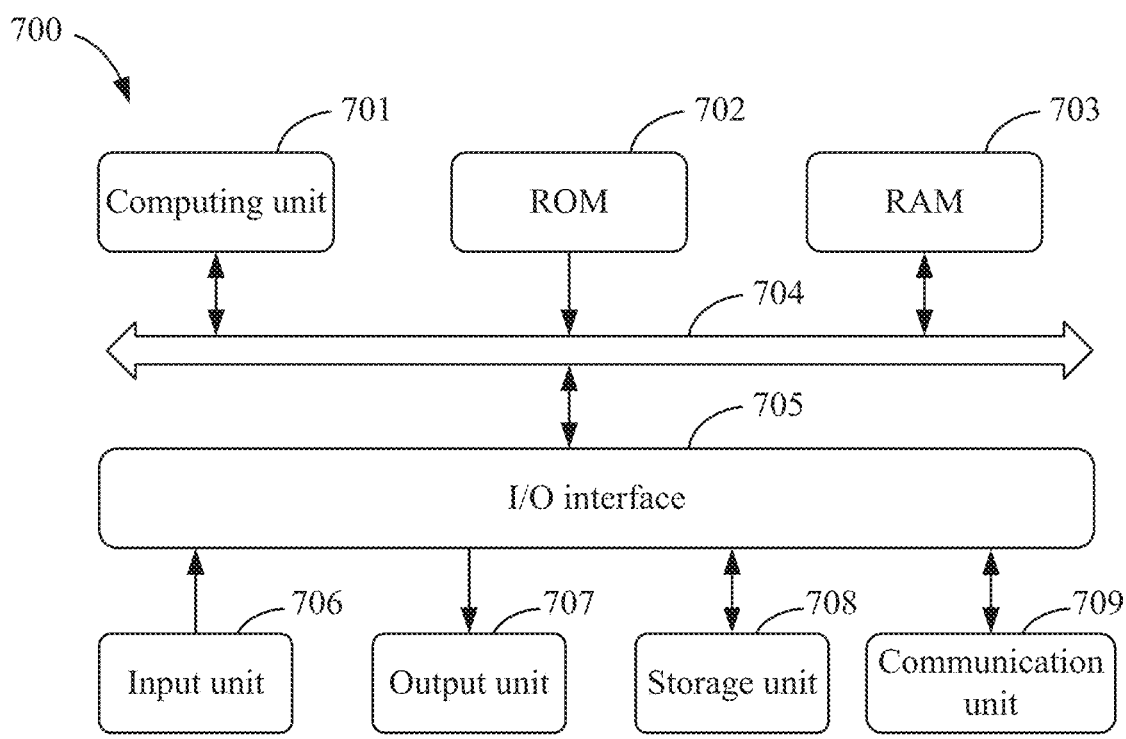
FIG. 7 is a block diagram of an electronic device for implementing a map data processing method according to an embodiment of the present disclosure.

FIG. 7 is a block diagram illustrative of an exemplary electronic device 700 that may be used for implementing an embodiment of the present disclosure. Electronic devices are intended to represent various forms of digital computers, for example, laptop computers, desktop computers, worktables, personal digital assistants, servers, blade servers, mainframe computers, and other applicable computers. The electronic devices may also represent various forms of mobile devices, for example, personal digital assistants, cellphones, smartphones, wearable devices, and other similar computing devices. Herein the shown components, the connections and relationships between these components, and the functions of these components are illustrative only and are not intended to limit the implementation of the present disclosure as described and/or claimed herein.

As shown in FIG. 7, the device 700 includes a computing unit 701. The computing unit 701 may perform various appropriate actions and processing according to a computer program stored in a read-only memory (ROM) 702 or a computer program loaded into a random-access memory (RAM) 703 from a storage unit 708. Various programs and data required for operations of the device 700 may also be stored in the RAM 703. The computing unit 701, the ROM 702, and the RAM 703 are connected to each other through a bus 704. An input/output (I/O) interface 705 is also connected to the bus 704.

Multiple components in the device 700 are connected to the I/O interface 705. The multiple components include an input unit 706 such as a keyboard or a mouse, an output unit 707 such as various types of displays or speakers, the storage unit 708 such as a magnetic disk or an optical disk, and a communication unit 709 such as a network card, a modem, or a wireless communication transceiver. The communication unit 709 allows the device 700 to exchange information/data with other devices over a computer network such as the Internet and/or over various telecommunication networks.

The computing unit 701 may be various general-purpose and/or dedicated processing components having processing and computing capabilities. Some examples of the computing unit 701 include, but are not limited to, central processing units (CPUs), graphics processing units (GPUs), various dedicated artificial intelligence (AI) computing chips, various computing units running machine learning models and algorithms, digital signal processors (DSPs), and any appropriate processors, controllers and microcontrollers. The computing unit 701 performs various methods and processing described above, such as the map data processing method. For example, in some embodiments, the map data processing method may be implemented as a computer software program tangibly included in a machine-readable medium such as the storage unit 708. In some embodiments, part or all of a computer program may be loaded and/or installed on the device 700 via the ROM 702 and/or the communication unit 709. When the computer program is loaded to the RAM 703 and executed by the computing unit 701, one or more steps of the map data processing method described above may be performed. Alternatively, in other embodiments, the computing unit 701 may be configured, in any other appropriate manner (for example, by means of firmware), to perform the map data processing method.

Herein various embodiments of the systems and techniques described above may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software and/or combinations thereof. The various embodiments may include implementations in one or more computer programs. The one or more computer programs are executable and/or interpretable on a programmable system including at least one programmable processor. The programmable processor may be a dedicated or general-purpose programmable processor for receiving data and instructions from a memory system, at least one input device, and at least one output device and transmitting the data and instructions to the memory system, the at least one input device, and the at least one output device.

Program codes for implementation of the method of the present disclosure may be written in any combination of one or more programming languages. These program codes may be provided for a processor or controller of a general-purpose computer, a dedicated computer, or another programmable data processing device such that the program codes, when executed by the processor or controller, cause functions/operations specified in the flowcharts and/or block diagrams to be implemented. The program codes may all be executed on a machine; may be partially executed on a machine; may serve as a separate software package that is partially executed on a machine and partially executed on a remote machine; or may all be executed on a remote machine or a server.

In the context of the present disclosure, the machine-readable medium may be a tangible medium that includes or stores a program available for an instruction execution system, apparatus, or device or a program used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any appropriate combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM), a flash memory, an optical fiber, a portable compact disk read-only memory (CD-ROM), an optical memory device, a magnetic memory device, or any suitable combination thereof.

In order that interaction with a user is provided, the systems and techniques described herein may be implemented on a computer. The computer has a display device (for example, a cathode-ray tube (CRT) or a liquid-crystal display (LCD) monitor) for displaying information to the user; and a keyboard and a pointing device (for example, a mouse or a trackball) through which the user can provide input for the computer. Other types of devices may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware, or front-end components. The components of the system may be interconnected by any form or medium of digital data communication (for example, a communication network). Examples of the communication network include a local area network (LAN), a wide area network (WAN), a blockchain network, and the Internet.

The computing system may include clients and servers. A client and a server are generally remote from each other and typically interact through a communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related VPS service. The server may also be a server of a distributed system, or a server combined with blockchain.

The artificial intelligence technology is the study of making computers simulate certain human thinking processes and intelligent behaviors (such as learning, reasoning, thinking, and planning) both at the hardware and software levels. Artificial intelligence hardware technology generally includes technology such as sensors, dedicated artificial intelligence chips, cloud computing, distributed storage, and big data processing. Artificial intelligence software technology mainly includes several types of major technology such as computer vision technology, speech recognition technology, natural language processing technology, machine learning/deep learning technology, big data processing technology, and knowledge mapping technology.

Cloud computing refers to a technical system which accesses flexible extensible shared physical or virtual resource pools through the network and may deploy and manage resources as needed or in a manner of self-service. The resources may include servers, operating systems, networks, software, applications, storage devices, and the like. Through the cloud computing technology, efficient and powerful data processing capabilities can be provided for technical applications and model training such as artificial intelligence and blockchain.

It is to be understood that various forms of the preceding flows may be used, with steps reordered, added, or removed. For example, the steps described in the present disclosure may be executed in parallel, in sequence, or in a different order as long as the desired result of the technical solution disclosed in the present disclosure is achieved. The execution sequence of these steps is not limited herein.

The scope of the present disclosure is not limited to the preceding embodiments. It is to be understood by those skilled in the art that various modifications, combinations, sub-combinations, and substitutions may be made depending on design requirements and other factors. Any modification, equivalent substitution, improvement, and the like made within the spirit and principle of the present disclosure are within the scope of the present disclosure.

What is claimed is:

1. A map data processing method, comprising:
processing landform coverage data according to a type of surface species coverage and a data processing rule associated with the type of surface species coverage to obtain a surface species coverage effect map; and
generating a landform map according to the surface species coverage effect map and a reference map;
wherein processing the landform coverage data according to the type of surface species coverage and the data processing rule associated with the type of surface species coverage to obtain the surface species coverage effect map comprises:
extracting species coverage region data corresponding to the type of surface species coverage from the landform coverage data according to the type of surface species coverage;
correcting a type of surface species coverage for error data in the species coverage region data according to a region adjoining relationship of the species coverage region data, wherein the error data is data about a species coverage region whose area is less than an area threshold;
performing, according to a region mapping rule associated with the type of surface species coverage, combination and rendering on species coverage region data belonging to a same type of surface species coverage after an update as one layer to generate an initial surface species coverage effect map; and
adjusting, according to a type adjustment rule associated with the type of surface species coverage, a type of surface species coverage for species coverage region data in the initial surface species coverage effect map to obtain a final surface species coverage effect map.

2. The method according to claim 1, after performing the combination and the rendering on the species coverage region data belonging to the same type of surface species coverage after the update as the one layer, further comprising:
in response to a region overlapping relationship existing between species coverage region data in at least two layers, adjusting, according to an area size relationship between regions corresponding to the species coverage region data in the at least two layers, locations where the at least two layers in which the species coverage region data is located are displayed.

3. The method according to claim 1, wherein adjusting, according to the type adjustment rule associated with the type of surface species coverage, the type of surface species coverage for the species coverage region data in the initial surface species coverage effect map comprises:
extracting a layer where each type of surface species coverage is located from the initial surface species coverage effect map; and
adjusting species coverage region data in each layer and a type of surface species coverage for the species coverage region data according to a layer level of the type of surface species coverage and an intersection-difference relationship between reference region data of the reference map and the species coverage region data in the each layer.

4. The method according to claim 1, wherein extracting the species coverage region data corresponding to the type of surface species coverage from the landform coverage data according to the type of surface species coverage comprises:
  extracting a species coverage region corresponding to the type of surface species coverage from the landform coverage data according to a grayscale range corresponding to the type of surface species coverage; and
  extracting a region contour of the species coverage region and performing coordinate vector conversion on extracted contour data to obtain the species coverage region data corresponding to the type of surface species coverage.

5. The method according to claim 4, before extracting the species coverage region corresponding to the type of surface species coverage from the landform coverage data, further comprising:
  downsampling the landform coverage data and remapping the type of surface species coverage.

6. The method according to claim 1, further comprising:
  determining an effect map of a river system according to data about the river system; and
  determining a terrain effect map according to terrain elevation data;
  wherein correspondingly, generating the landform map according to the surface species coverage effect map and the reference map comprises:
  generating the landform map according to the effect map of the river system, the terrain effect map, the surface species coverage effect map, and the reference map.

7. A map data processing apparatus, comprising:
  at least one processor; and
  a memory communicatively connected to the at least one processor;
  wherein the memory stores an instruction executable by the at least one processor, and the at least one processor is configured to:
  process landform coverage data according to a type of surface species coverage and a data processing rule associated with the type of surface species coverage to obtain a surface species coverage effect map; and
  generate a landform map according to the surface species coverage effect map and a reference map;
  wherein the at least one processor is configured to:
  extract species coverage region data corresponding to the type of surface species coverage from the landform coverage data according to the type of surface species coverage;
  correct a type of surface species coverage for error data in the species coverage region data according to a region adjoining relationship of the species coverage region data, wherein the error data is data about a species coverage region whose area is less than an area threshold;
  perform, according to a region mapping rule associated with the type of surface species coverage, combination and rendering on species coverage region data belonging to a same type of surface species coverage after an update as one layer to generate an initial surface species coverage effect map; and
  adjust, according to a type adjustment rule associated with the type of surface species coverage, a type of surface species coverage for species coverage region data in the initial surface species coverage effect map to obtain a final surface species coverage effect map.

8. The apparatus according to claim 7, wherein the at least one processor is further configured to:
  in response to a region overlapping relationship existing between species coverage region data in at least two layers, adjust, according to an area size relationship between regions corresponding to the species coverage region data in the at least two layers, locations where the at least two layers in which the species coverage region data is located are displayed.

9. The apparatus according to claim 7, wherein the at least one processor is configured to:
  extract a layer where each type of surface species coverage is located from the initial surface species coverage effect map; and
  adjust species coverage region data in each layer and a type of surface species coverage for the species coverage region data according to a layer level of the type of surface species coverage and an intersection-difference relationship between reference region data of the reference map and the species coverage region data in the each layer.

10. The apparatus according to claim 7, wherein the at least one processor is configured to:
  extract a species coverage region corresponding to the type of surface species coverage from the landform coverage data according to a grayscale range corresponding to the type of surface species coverage; and
  extract a region contour of the species coverage region and perform coordinate vector conversion on extracted contour data to obtain the species coverage region data corresponding to the type of surface species coverage.

11. The apparatus according to claim 10, wherein the at least one processor is further configured to:
  downsample the landform coverage data and remap the type of surface species coverage.

12. The apparatus according to claim 7, wherein the at least one processor is further configured to:
  determine an effect map of a river system according to data about the river system; and
  determine a terrain effect map according to terrain elevation data; and
  generate the landform map according to the effect map of the river system, the terrain effect map, the surface species coverage effect map, and the reference map.

13. A non-transitory computer-readable storage medium storing a computer instruction for causing a computer to perform the following steps:
  processing landform coverage data according to a type of surface species coverage and a data processing rule associated with the type of surface species coverage to obtain a surface species coverage effect map; and
  generating a landform map according to the surface species coverage effect map and a reference map;
  wherein processing the landform coverage data according to the type of surface species coverage and the data processing rule associated with the type of surface species coverage to obtain the surface species coverage effect map comprises:
  extracting species coverage region data corresponding to the type of surface species coverage from the landform coverage data according to the type of surface species coverage;
  correcting a type of surface species coverage for error data in the species coverage region data according to a region adjoining relationship of the species coverage region data, wherein the error data is data about a species coverage region whose area is less than an area threshold;
  performing, according to a region mapping rule associated with the type of surface species coverage, combination and rendering on species coverage region data belonging to a same type of surface species coverage after an update as one layer to generate an initial surface species coverage effect map; and adjusting, according to a type adjustment rule associated with the type of surface species coverage, a type of surface species coverage for species coverage region data in the initial surface species coverage effect map to obtain a final surface species coverage effect map.

\* \* \* \* \*